United States Patent
Ueno

(10) Patent No.: US 6,761,482 B2
(45) Date of Patent: Jul. 13, 2004

(54) ROLLING GUIDE APPARATUS

(75) Inventor: Yoshihiko Ueno, Tokyo (JP)

(73) Assignee: THK Co., Ltd., Tokyo (JP)

( * ) Notice: Subject to any disclaimer, the term of this patent is extended or adjusted under 35 U.S.C. 154(b) by 66 days.

(21) Appl. No.: 10/283,046

(22) Filed: Oct. 30, 2002

(65) Prior Publication Data

US 2004/0086209 A1 May 6, 2004

(51) Int. Cl.⁷ .................................................. F16C 29/06
(52) U.S. Cl. ........................................................... 384/45
(58) Field of Search .............................. 384/43, 44, 45, 384/49

(56) References Cited

U.S. PATENT DOCUMENTS

| 5,145,260 | A | * | 9/1992 | Edelmann et al. | ............ | 384/43 |
| 5,217,308 | A | * | 6/1993 | Schroeder | ...................... | 384/45 |
| 5,829,882 | A | * | 11/1998 | Ng et al. | ....................... | 384/43 |
| 6,126,319 | A | * | 10/2000 | Toyota et al. | ................. | 384/43 |
| 6,186,664 | B1 | * | 2/2001 | Yamazaki et al. | ............ | 384/43 |

FOREIGN PATENT DOCUMENTS

| JP | 59-219520 | 12/1984 |
| JP | 8-219153 | 8/1996 |
| JP | 10-325414 | 12/1998 |

* cited by examiner

Primary Examiner—Thomas R. Hannon
(74) Attorney, Agent, or Firm—Westerman, Hattori, Daniels & Adrian, LLP

(57) ABSTRACT

A rolling guide apparatus includes a race shaft on which a rolling element rolling surface is formed in a longitudinal direction thereof, and a sliding table having an endless circulation passage. The endless circulation passage includes a load rolling surface corresponding to the rolling element rolling surface. Plural rolling elements are housed in the endless circulation passage. The sliding table has a sliding table main unit and side covers attached to respective ends of the sliding table main unit. The sliding table main unit has a load rolling surface section having the load rolling surface, and a main body section. The load rolling surface section is made from engineering ceramic. The main body section is made from machinable ceramic.

3 Claims, 6 Drawing Sheets

ROLLING GUIDE APPARATUS

BACKGROUND OF THE INVENTION

1. Field of the Invention

The present invention relates to a rolling guide apparatus having light-weight and high-rigidity and is applicable to a linear guide apparatus such as a machine tool or an X-Y table.

2. Description of the Related Art

A rolling guide apparatus—which is incorporated in a machine tool or the like and guides a table for carrying a workpiece—comprises a race shaft in which a rolling element rolling surface is formed in a longitudinal direction thereof; and a sliding table which has an endless circulation passage including a load rolling surface corresponding to the rolling element rolling surface and is attached to the race shaft via a plurality of rolling elements housed in the endless circulation passage. The race shaft and the sliding table are movable relatively to each other by means of rolling elements.

The sliding table comprises a sliding table main body in which the load rolling surface and a rolling element return passage substantially parallel to the load rolling surface are formed; and side covers in which changing direction passages for connecting both ends of the load rolling passage and the rolling element return passages and which are attached to respective ends of the sliding table main body.

Studies on such a rolling guide apparatus have been examined for the purpose of making the sliding table light-weight, reducing inertia force, and enabling high-speed start and stop operations. Rolling guide apparatus described in Japanese Patent Application Laid-Open Nos. 219520/1984 and 219153/1996 has a sliding table main unit, wherein the sliding table main unit except a load rolling surface is made from synthetic resin.

Studies on the load rolling surface of the sliding table main body have been examined for improving rolling fatigue strength and abrasion resistance against rolling elements. Japanese Patent Application Laid-Open No. 325414/1998 discloses forming guide surfaces of a sliding table or the entirety of the sliding table from ceramic to prevent generation of waste, which would otherwise be caused when rolling elements come into contact with the rolling element rolling surface.

Demand exists for a sliding table main unit having superior mechanical characteristics such as flexural strength, and easy to be machined. The sliding table main unit made from synthetic resin except the load rolling surface is easy to be machined but not necessarily superior in terms of mechanical characteristics.

Even in case where the load rolling surface is made from ceramic to prevent generation of waste, the rolling fatigue strength and abrasion resistance against rolling elements are not enough.

SUMMARY OF THE INVENTION

The present invention provides a rolling guide apparatus applicable to a linear guide apparatus such as a machine tool or an X-Y table, and particularly, a light-weight and high-rigidity rolling guide apparatus achieved by compounding of ceramic raw material.

According to a first aspect of the present invention, there is provided a rolling guide apparatus comprising: a race shaft having a rolling element rolling surface formed in a longitudinal direction thereof; a sliding table having an endless circulation passage including a load rolling surface corresponding to the rolling element rolling surface, the sliding table being movable relatively to the race shaft; and a plurality of rolling elements being housed in the endless circulation passage so as to circulate in accordance with relative movement of the race shaft and the sliding table, wherein the sliding table comprises: a sliding table main unit having the load rolling surface and a rolling element return passage substantially parallel to the load rolling surface; and side covers each having a changing direction passage for connecting ends of the load rolling surface and the rolling element return passage, the side covers being attached to respective ends of the sliding table main unit, and wherein the sliding table main unit comprises: a load rolling surface section made from engineering ceramic and having the load rolling surface; and a main body section made from machinable ceramic.

According to the first aspect, the load rolling surface section having the load rolling surface is made from engineering ceramic having superior rolling fatigue strength and superior abrasion resistance. The main body section which is the rest portion of the sliding table main unit is made from machinable ceramic having a superior mechanical characteristic and is easy to machine. Thus, the sliding table main unit fulfills the characteristics that have been required hitherto and accomplish weight reduction and high rigidity. Hence, high-speed start and stop operations with small inertia force is realized.

According to a second aspect of the present invention, the rolling guide apparatus further comprises: a race housing groove being formed in the main body section; and a bearing race serving as the load rolling surface section, the bearing race being fitted into the race housing groove.

According to the second aspect, the race housing groove can be readily formed in the main body section made from machinable ceramic having ease of machining. Hence, a bearing race which has superior rolling fatigue strength and acts as a load rolling surface section can be readily fitted into the race housing groove. The bearing race is made from engineering ceramic having superior rolling fatigue strength. Hence, there can be achieved a long-life rolling guide apparatus.

According to a third aspect of the present invention, the race housing groove and the bearing race have semi-circular cross-sectional profiles which complement each other, the bearing race is rotatable with respect to the race housing groove.

According to the third aspect, the race housing groove and the bearing race have semi-circular cross-sectional profiles which complement each other, and the race housing groove and the bearing race are formed so as to be rotatable. Hence, self aligning operation can be effected.

BRIEF DESCRIPTION OF THE DRAWINGS

FIGS. 6A and 6B are descriptive views, wherein FIG. 6A shows a reciprocal thrust rolling life tester and FIG. 6B shows a test piece.

DETAILED DESCRIPTION OF THE PREFFERD EMBODIMENTS

A rolling guide apparatus of the invention will be described with reference to the drawings.

Figure 1:
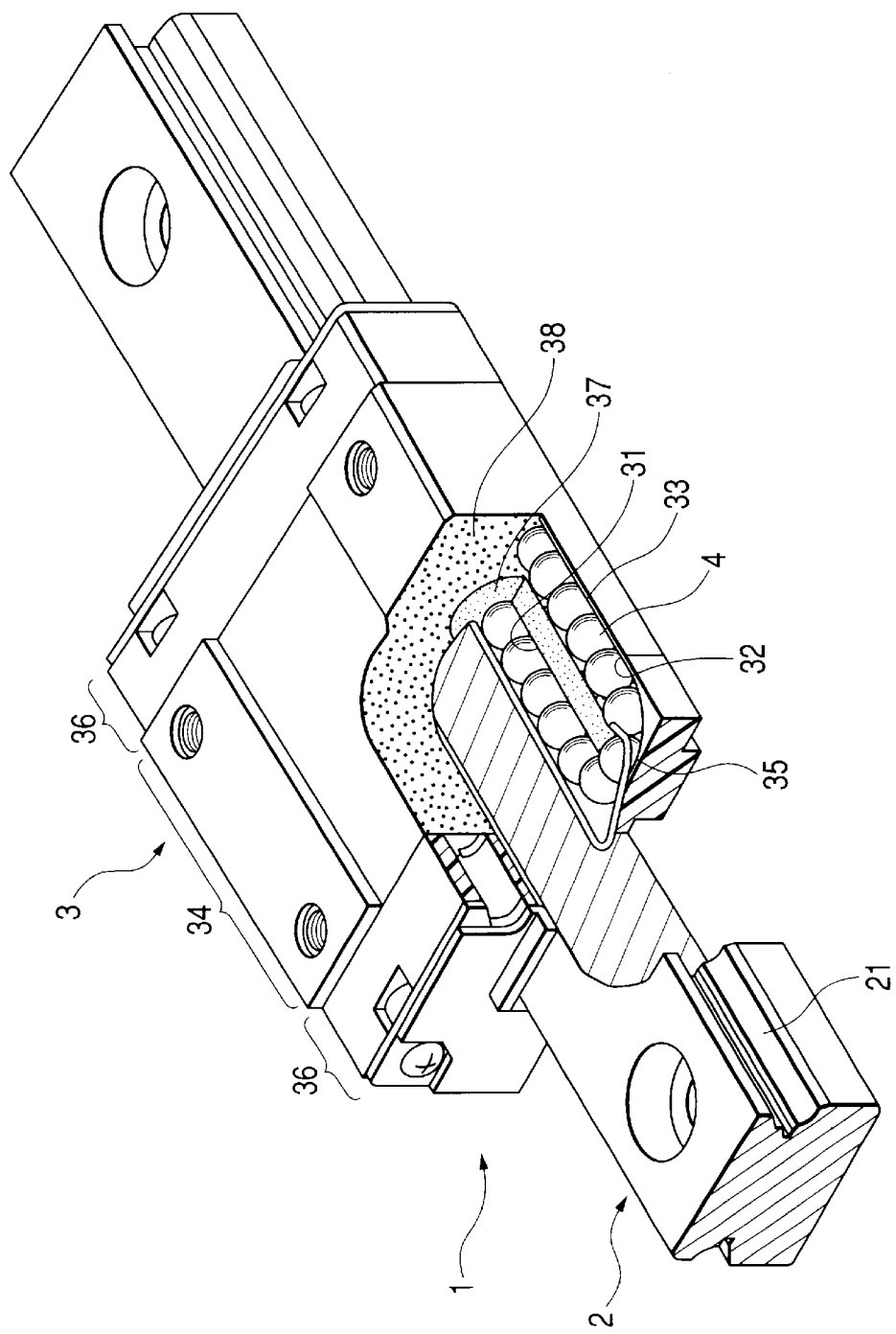
FIG. 1 is partially-fragmentary perspective view showing an example of a rolling guide apparatus of the invention.
Figure 2:
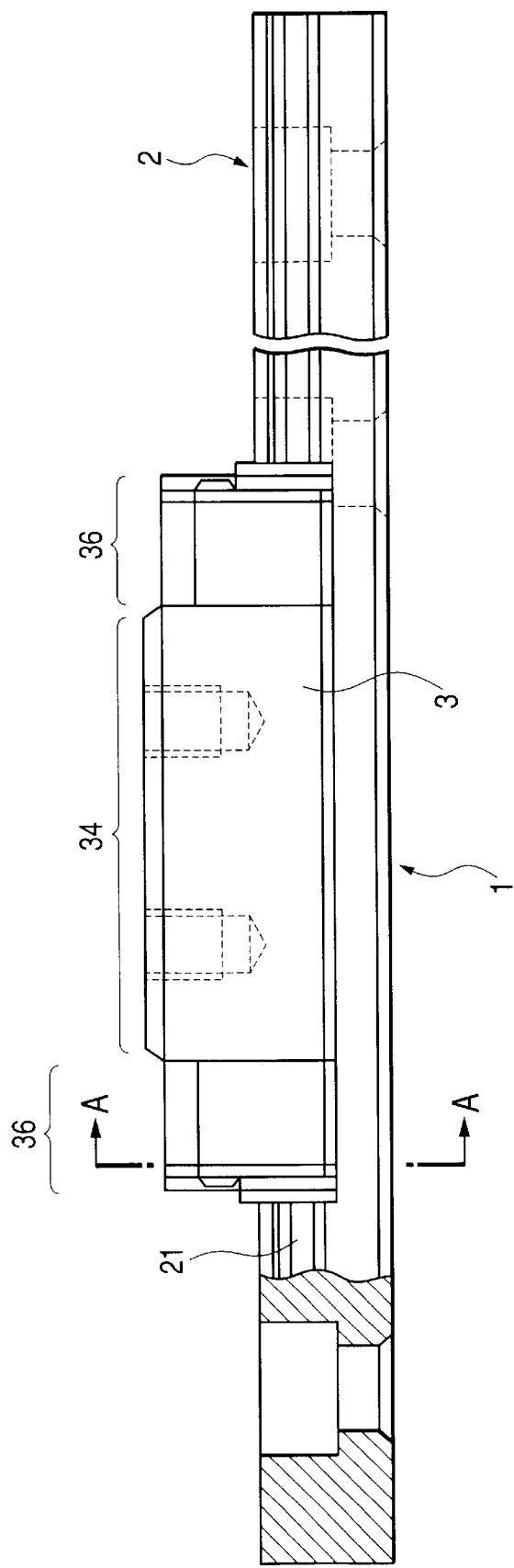
FIG. 2 is a side view showing the rolling guide apparatus.

As shown in FIG. 1, a rolling guide apparatus 1 comprises a rail 2 on which a rolling element rolling surface 21 is formed in a longitudinal direction and which serves as a race shaft; a block 3 which has an endless circulation passage 32 including a load rolling surface 31 corresponding to the rolling element rolling surface 21 and which serves as a sliding table being movable relatively to the rail 2; and a plurality of rolling elements 4 which are housed in the endless circulation passage 32 and circulated in accordance with relative movement arising between the rail 2 and the block 3.

The block 3 comprises a sliding table main body (hereinafter called a "block main unit 34") in which the load rolling surface 31 and a rolling element return passage 33 substantially parallel to the load rolling surface 32 are formed; and side covers 36 which are to be attached to respective ends of the block main unit 34. In each of the side covers 36, there is formed a changing direction passage 35 for connecting the ends of the load rolling surfaces 31 and the rolling element return passages 33.

The block main unit 34 has a load rolling surface section 37 which has the load rolling surface 31 and is made from engineering ceramic; and a main body section 38 made from machinable ceramic.

The rolling guide apparatus 1 is not limited to any specific type and may have the rail 2 of linear type as shown in FIG. 1 or a rail of curved type. The rolling elements are not limited to rolling elements of any particular type and may be ball-shaped rolling elements 4 as shown in FIG. 1 or roller-shaped rolling elements. The rolling guide apparatus of the invention is applicable to a rolling guide apparatus having various types of rails 2 or various types of rolling elements 4.

The load rolling surface section 37 of the block main unit 34 has at least the load rolling surface 32. The load rolling surface is not limited to any specific shapes and may assume a variety of shapes. The load rolling surface section 37 is made from engineering ceramic. Hence, the load rolling surface section 37 having the load rolling surface 31 of superior rolling fatigue strength and abrasion resistance is provided.

As the engineering ceramic constituting the load rolling surface section 37, engineering ceramic having a bulk specific gravity of 2.5 to 6.5 g/cm$^3$; a four-point flexural strength of 300 to 1500 MPa at room temperature specified by JIS-R-1601; Vickers hardness of 1000 to 3000 Hv; and a thermal expansion coefficient of 3.0 to 11.0×10$^{-6}$/° C. at a temperature of 40 to 800° C. Here, "11.0×10$^{-6}$" means "11.0 times 10$^{-6}$". The engineering ceramic having such characteristics has a light weight and is superior in terms of rigidity, abrasion resistance, and dimensional stability. Hence, such engineering ceramic is preferably used for the load rolling surface section 37 of the block main unit 34.

In case where the engineering ceramic has a bulk specific gravity of less than 2.5 g/cm$^3$, the flexural strength of the load rolling surface section may fall outside the foregoing range. In case where the engineering ceramic has a bulk specific gravity of more than 6.5 g/cm$^3$, the load rolling surface section 37 becomes heavy. A preferable bulk specific gravity ranges from 3.0 to 6.0 g/cm$^3$. $Si_3N_4$ which will be described later has a more preferable bulk specific gravity ranges from 3.0 to 3.4 g/cm$^3$. Since such engineering ceramic is lighter in weight than metal that has hitherto been utilized for a block main unit, the load rolling surface section 37 is made light. In particular, ceramic nitride has a bulk specific gravity of about 3.2 g/cm$^3$ or thereabouts and hence contributes to a reduction in the weight of the entire block. Consequently, the inertia force of the block is made small, enabling high-speed start and stop operation of the block.

In case where the engineering ceramic has a flexural strength of less than 300 MPa, sufficient rigidity required for the load rolling surface section 37 cannot be achieved. The reason why the flexural strength of engineering ceramic is set to a value of 1500 MPa or less is that, under the current circumstances, difficulty is encountered in manufacturing engineering ceramic having a flexural strength of more than 1500 MPa and the foregoing characteristics. A preferable flexural strength is 700 to 1200 MPa which is achieved at room temperature specified in JIS-R-1601, through a four-point bending test. $Si_3N_4$ that has been subjected to high-temperature isostatic compression (HIP) is particularly preferably used as engineering ceramic falling within the foregoing range.

In case where the engineering ceramic has a Vickers hardness of less than 1000 Hv, sufficient rigidity required for the load rolling surface section 37 may sometimes not be achieved. The reason why the Vickers hardness is set to a value of 3000 Hv or less is that, under the current circumstances, difficulty is encountered in manufacturing engineering ceramic having a Vickers hardness of more than 3000 Hv and the foregoing characteristics. A preferable Vickers hardness is 1300 to 2000 Hv, and a more preferable Vickers hardness is 1400 to 1700 Hv.

In case where the thermal expansion coefficient of engineering ceramic exceeds 11.0×10$^{-6}$/° C. at 40 to 800° C., the load rolling surface section 37 may fail to achieve sufficient dimensional stability. The reason why the thermal expansion coefficient of engineering ceramic is set 3.0×10$^{-6}$/° C. or more is that, under the current circumstances, difficulty is encountered in manufacturing engineering ceramic having a thermal expansion coefficient of less than 3.0×10$^{-6}$/° C. and the foregoing characteristics. A preferable thermal expansion coefficient is 3.0 to 4.0×10$^{-6}$/° C.

The engineering ceramic is not limited to any specific ceramic, as long as the ceramic falls within the preferable range of characteristics. Thus, a variety of kinds of engineering ceramic may be used. In particular, a sintered body consisting of silicon nitride ($Si_3N_4$) is preferable as the engineering ceramic. Silicon nitride ($Si_3N_4$) that has been subjected to high-temperature isostatic compression (HIP) is particularly preferable.

A composite sintered body—which is made from engineering ceramic such as silicon nitride in which another type of ceramic particles are dispersed—may also be employed. Dispersed particles of the composite sintered body include ceramic materials, such as titanium nitride (TiN), silicon carbide (SiC), partially-stabilized zirconia ($ZrO_2$), alumina-zirconia ($Al_2O_3$—$ZrO_3$), alumina ($Al_2O_3$), a SIALON complex (SiAlON), or mullite ($3Al_2O_3$—$SiO_2$). Even in this case, a composite sintered body that has been subjected to high-temperature isostatic compression is particularly preferable.

Further, the engineering ceramic has superior rolling fatigue strength, compression strength, and a sliding characteristic. Hence, the rolling fatigue strength, abrasion resistance, and antiseizing characteristic of the load rolling surface 31 of the load rolling surface section 37 are improved. Consequently, there can be prevented abrasion and seizing of the block 3 having such a load rolling surface section 37, which would otherwise be caused when the block 3 starts and stops. Further, the block 3 can be used over a long period of time without involvement of surface exfoliation. Such engineering ceramic is lower in thermal expansion than the material constituting the conventional block 3. Hence, the precision of the load rolling surface 31 can be ensured despite of changes in ambient temperature. Consequently, there can be realized a high-speed, high-precision operation of the block 3.

Figure 5:
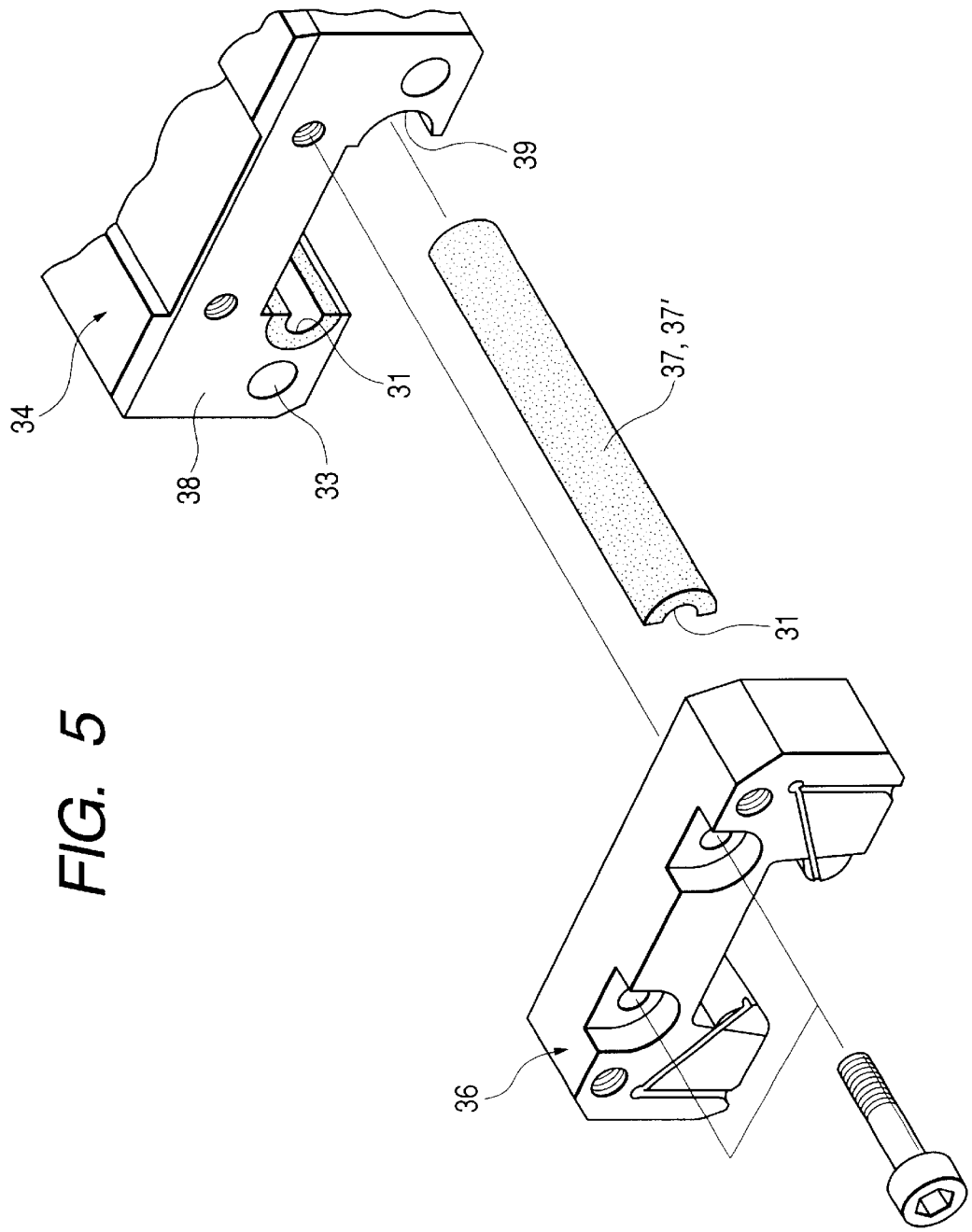
FIG. 5 is a exploded perspective view showing a mode in which a bearing race is fitted into a race housing groove.

The load rolling surface section 37 can be embodied as a bearing race having a semi-circular cross-sectional profile such as that shown in FIG. 5. The bearing race 37' serving as the foregoing load rolling surface section 37 is fitted to a race housing groove 39 formed in the main body section 38 of the block main unit 37 and housed in the block main unit 34. The load rolling surface section 37 made from engineering ceramic is manufactured by a common method of manufacturing a ceramic member to be described later.

As shown in FIG. 5, the thus-formed bearing race 37' is fitted to the race housing groove 39 formed in the block main unit 34. In case of using ball-shaped rolling elements, the race housing groove 39 and the bearing race 37' are preferably provided with semi-circular cross-sectional profiles which complement each other. Even in case of using roller-shaped rolling elements, the race housing groove 39 and the bearing race 37' are preferably provided with cross-sectional profiles which complement each other. By means of such a profile, the bearing race 37' can be readily fitted and incorporated into the race housing groove 39. Since the bearing race 37' is made from engineering ceramic having superior rolling fatigue strength, there is realized a long-life rolling guide apparatus.

Figure 3:
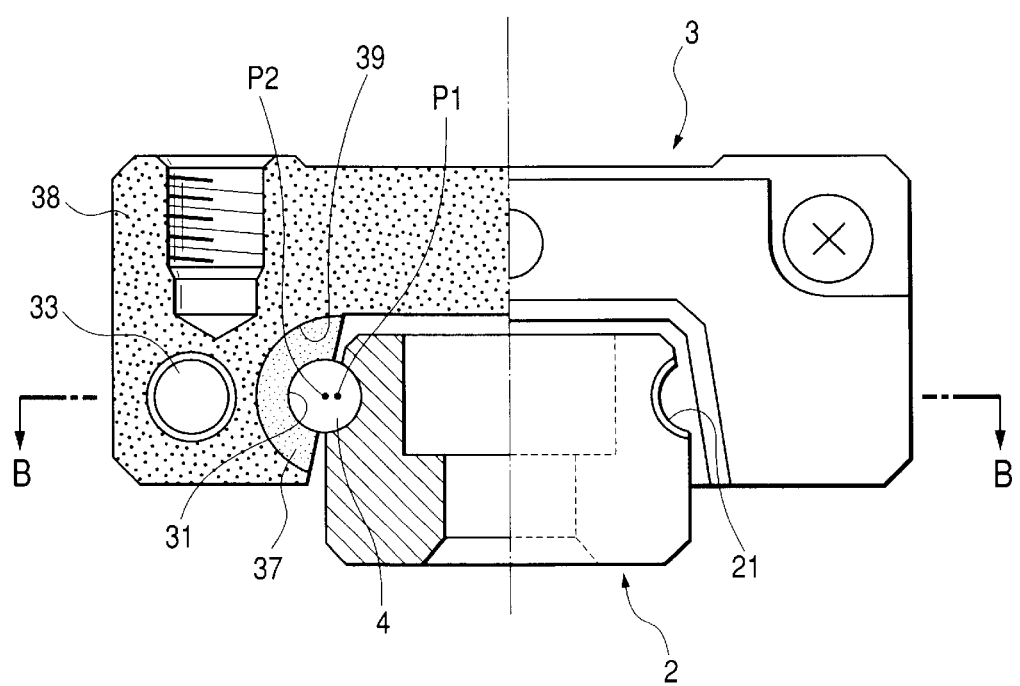
FIG. 3 is a front view of the rolling guide apparatus, partially showing a cross section taken along line A—A shown in FIG. 2.
Figure 4:
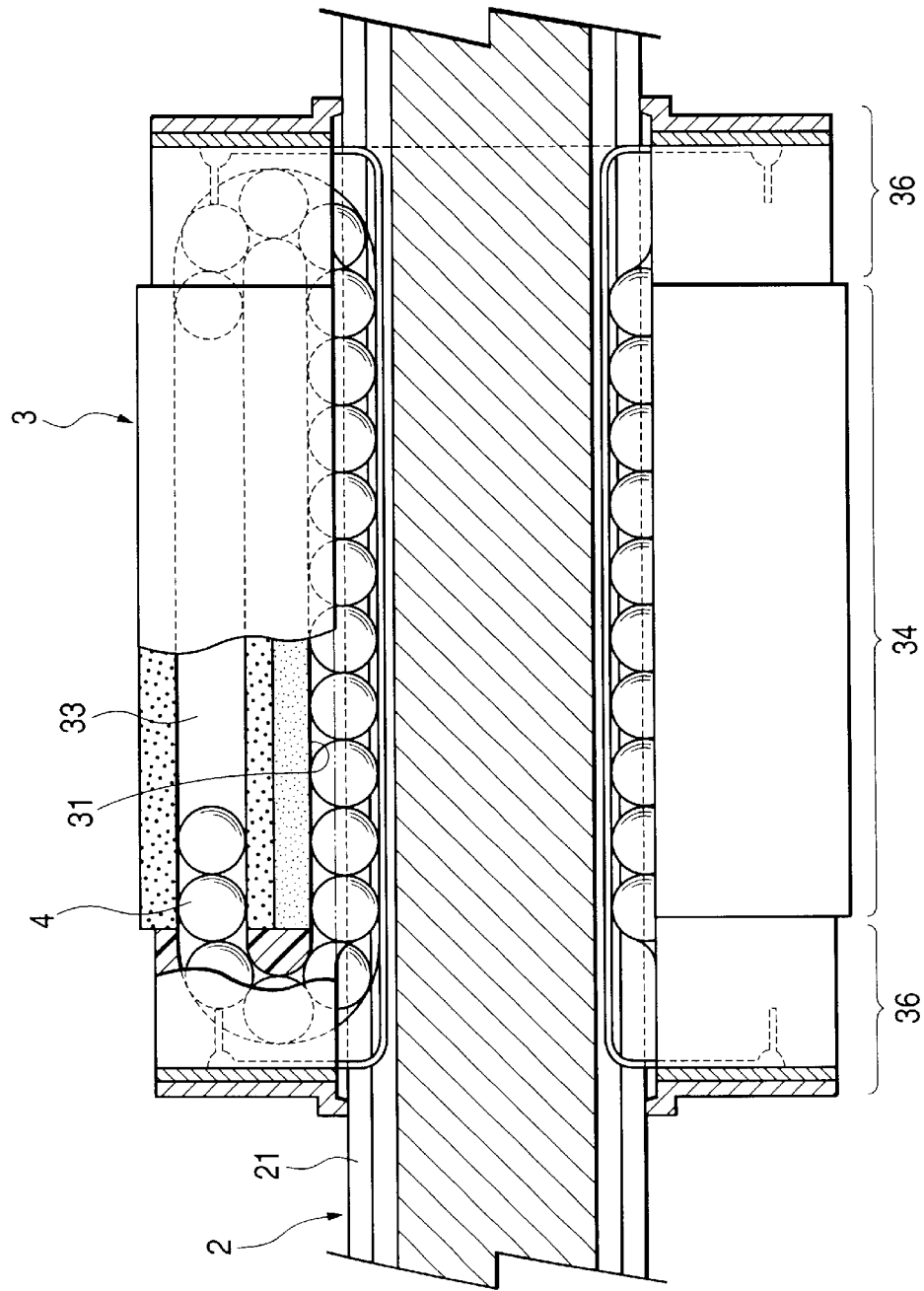
FIG. 4 is a front view of the rolling guide apparatus, partially showing a cross section taken along line B—B shown in FIG. 3.

The bearing race 37' and the race housing groove 39 are preferably provided with cross-sectional profiles which complement each other and formed so as to be rotatable to each other. As a result, self-aligning operation is effected. A rotation center P1 of the bearing race 37' is offset to an interior position relative to a center P2 of the rolling body (ball) 4 with respect to the widthwise direction of the block 3 as shown in FIG. 3.

The main body section 38 constitutes the entire structure of the block main unit 34. The main body section 38 is not limited to any specific shape but may assume a variety of shapes. The main body section 38 is made from machinable ceramic. Hence, there can be realized a main body section 38 having a superior mechanical characteristic and ease of machining. Here, the term "machinable ceramic" is a generic name of ceramic which is superior in terms of ease of cutting.

As the machinable ceramic constituting the main body section 38, machinable ceramic having a bulk specific gravity of 2.5 to 6.5 g/cm$^3$; a four-point flexural strength of 100 to 700 MPa at room temperature specified by JIS-R-1601; Vickers hardness of 300 to 800 Hv; and a compressive strength of 500 to 1500 Mpa may be used. The machinable ceramic having such characteristics has a superior ease of mechanical machining and a mechanical characteristic of a great flexural strength can be preferably used for the main body section 38 of the block main unit 34 which is to be subjected to tapping or machining of through holes.

In case where the machinable ceramic has a bulk specific gravity of less than 2.5 g/cm$^3$, the flexural strength of main body section falls outside the foregoing range. In case where the machinable ceramic has a bulk specific gravity of more than 6.5 g/cm$^3$, the main body section 38 becomes heavy. A preferable specific gravity ranges from 2.5 to 3.5 g/cm$^3$, and a more preferable specific gravity ranges from 2.8 to 3.0 g/cm$^3$ which is a specific gravity of AlN-BN composite ceramic to be described later. Since such machinable ceramic is lighter in weight than metal that has hitherto been utilized for the main body section 38, the main body section 38 can be made lighter in weight. In particular, AlN-BN composite ceramic has a bulk specific gravity of about 2.9 g/cm$^3$ or thereabouts and hence can contribute to a reduction in the weight of the entire block. Consequently, the inertia force of the block can be made small, and high-speed start and stop operation of the block can be made feasible.

In case where the machinable ceramic has a flexural strength of less than 100 MPa, sufficient rigidity required for the main body section 38 cannot be achieved. In case where the flexural strength exceeds 700 MPa, the ease of machining of ceramic becomes deficient. A preferable flexural strength is 250 to 350 MPa which is achieved at room temperature specified in JIS-R-1601, through a four-point bending test. AlN-BN composite ceramic is particularly preferably used as machinable ceramic falling within the foregoing range.

In case where the machinable ceramic has a Vickers hardness of less than 300 Hv, the ceramic may fail to possess a mechanical characteristic preferable for the main body section 38. In case where the Vickers hardness exceeds 800 Hv, the ease of mechanical processing may be deteriorated. AlN-BN composite ceramic having a Vickers hardness of 350 to 450 Hv or thereabouts is particularly preferably used as the machinable ceramic falling within the foregoing range.

In case where the machinable ceramic has a compression strength of less than 500 MPa or more than 1500 MPa, the ease of machining of ceramic may be deteriorated. Preferable compression strength ranges from 1000 to 1200 MPa.

The machinable ceramic is not limited to any specific ceramic, as long as the ceramic falls within the preferable range of characteristics. Thus, a variety of kinds of machinable ceramic can be used. In particular, AlN-BN composite ceramic is preferable.

Such machinable ceramic is lighter in weight than metal that has hitherto been used for the block main unit. Hence, a reduction in the weight of the block main unit 34 can be achieved. In particular, the AlN-BN composite ceramic has a bulk specific gravity of about 2.9 and hence can greatly contribute to a reduction in the weight of the entire block. Consequently, the inertia force of the block 3 can be reduced, thereby enabling high-speed start and stop operations.

The machinable ceramic has superior mechanical characteristics, such as flexural strength and compression strength. Hence, the machinable ceramic can be preferably used as the main body section 38 of the block main unit 34 in the rolling guide apparatus 1. Since such machinable ceramic is lower in thermal expansion than the material constituting the conventional block 3, the precision of the machinable ceramic can be ensured despite of changes in ambient temperature. Consequently, there can be realized high-speed, high-precision operation of the block 3.

The race housing groove 39 is formed in the main body section 38. The race housing groove 39 can be formed when the main body section 38 of predetermined shape is formed by sintering machinable ceramic. Also, the race housing groove 39 can be formed after the main body section without the race housing groove 39 is formed by mechanical machining. The main body section 38 made from machinable ceramic is formed by a common method of manufacturing ceramic members, which will be described later.

The race housing groove 39 is formed into a predetermined shape corresponding to the shape of the bearing race 37'. As mentioned above, the bearing race 37' is fitted into the race housing groove 39. Hence, the dimension of the race housing groove 39 and that of the bearing race 37' are determined in consideration of a fitting mode.

The load rolling surface section 37 having the load rolling surface 31 is made from the engineering ceramic having superior rolling fatigue strength and abrasion resistance, and the main body section 38 is made from the machinable ceramic having a superior mechanical characteristic and a superior ease of machining. Hence, the block main unit 34 can achieve weight reduction and high rigidity, thereby enabling high-speed start and stop operations with small inertia force.

A method of producing the block main unit 34 having the load rolling surface section 37 consisting of engineering ceramic and the main body section 38 consisting of machinable ceramic will be described. The load rolling surface section 37 and the main body section 38 can be formed according to a conventional method.

Ceramic for molding purpose which is constituted of respective raw materials through granulation is first prepared. The ceramic is molded through metal-mold molding, rubber pressing, or injection molding. The molded product is subjected to mechanical machining, and the thus-machined molded product is sintered by means of pressure sintering, hot pressing, or hot isostatic pressing. Subsequently, the molded product is subjected to secondary processing by means of cutting, whereby the load rolling surface section 37 of predetermined shape and the main body section 38 of predetermined shape are produced.

The rolling guide apparatus 1 is manufactured through use of the thus-produced load rolling surface section 37 and the main body section 38. The rail 2 and the rolling elements 4, which are manufactured according to a conventional method, are used.

The invention will be described in more detail by reference to examples.

EXAMPLE 1

A block 3 of Example 1 comprises a block main unit 34 made of ceramic and side covers 36 made of metal. The block 3 has a shape of nominal model number RSR7W produced by THK Co., Ltd. Specifically, the block 3 has an outer dimension; that is, a height of 9 mm, a width of 25 mm, and a length of 31 mm. As mentioned above, the block 3 is constituted by the bearing race 37' having the load rolling surface 31 and the main body section 38.

The bearing race 37' is formed from silicon nitride ($Si_3N_4$: produced by NGK INSULATORS Ltd.) which is engineering ceramic, the ceramic having been subjected to high-temperature isostatic compression and having a bulk specific gravity of 3.2 g/cm$^3$, a flexural strength of 1200 MPa which is achieved at room temperature specified in JIS-R-1601, through a four-point bending test, the Vickers hardness of 1500 Hv, and a thermal expansion coefficient of $3.0 \times 10^{-6}$/° C. at 40 to 800° C.

The main body section 38 is made from AlN-BN composite ceramic (ceramic type H produced by ISHIHARA SANGYO Co., Ltd.). Specifically, the AlN-BN composite ceramic has a bulk specified gravity of 2.9 g/cm$^3$; a flexural strength of 300 MPa which is achieved at room temperature specified in JIS-R-1601, through a four-point bending test, the Vickers hardness of 390 Hv, and a compression strength of 1200 MPa.

The race housing groove 39 is formed in the main body section 38, and the bearing race 37' is fitted and incorporated into the race housing groove 39. The race housing groove 39 of the main body section 38 was formed by means of grinding using rotary grinding stone, or cutting operation using a drill or a reamer. The race housing groove 39 and the bearing race 37' are provided with semicircular shapes which complement each other.

The side covers 36 and balls 4 made of SUS440C having a specific gravity of 7.8 g/cm$^3$ are attached to the block main unit 34.

COMPARATIVE EXAMPLE 1

A block 3 of Comparative Example 1 comprises a metal block main unit 34 and metal side covers 36. As in the case of the Example 1, the thus-manufactured block 3 has a shape of nominal model number RSR7W produced by THK Co., Ltd. Specifically, the block 3 has an outer dimension; that is, a height of 9 mm, a width of 25 mm, and a length of 31 mm. The block main unit 34 is not provided with a bearing race or a race housing groove, such as those described in connection with the Example 1.

The block main unit 34, side covers 36, and balls, all being produced from SUS440C having a specific gravity of 7.8 g/cm$^3$.

(Weight Evaluation)

The weight of the block main unit 34 of the Example 1 and the Comparative Example 1 were evaluated. Evaluation results are provided in Table 1.

TABLE 1

| | BLOCK | | | |
| --- | --- | --- | --- | --- |
| | BLOCK MAIN UNIT (g) | SIDE COVER (g) | BALL (g) | TOTAL WEIGHT (g) |
| EXAMPLE 1 | 7.1 | 3.6 | 1.0 | 11.7 |
| COMPARATIVE EXAMPLE 1 | 17.2 | 3.6 | 1.0 | 21.8 |

The block 3 of the Example 1 has about half weight of the Comparative Example 1, accomplishing considerable weight reduction. When the block 3 of the Example 1 was actually moved on a rail, the high-speed start and stop operations could be achieved with considerably small inertia force.

(Life Evaluation)

Figure 6A:
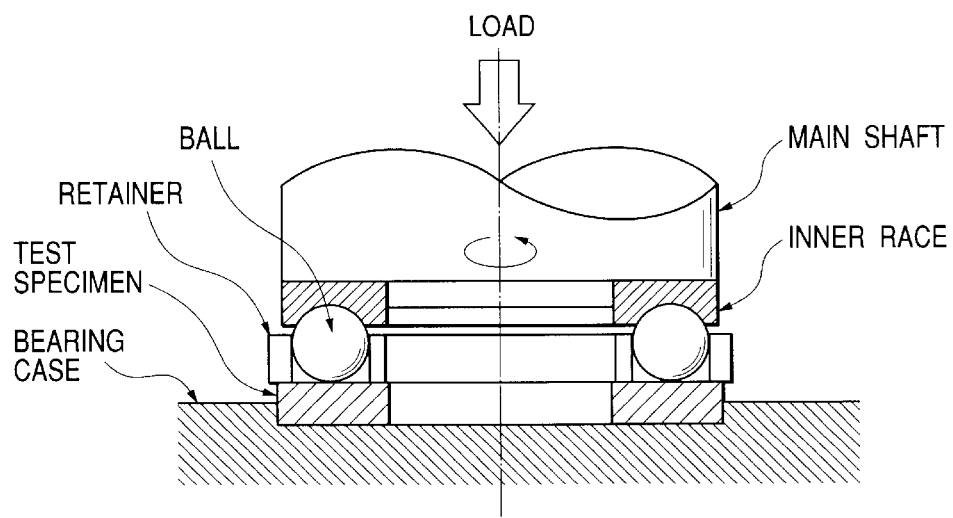
Figure 6B:
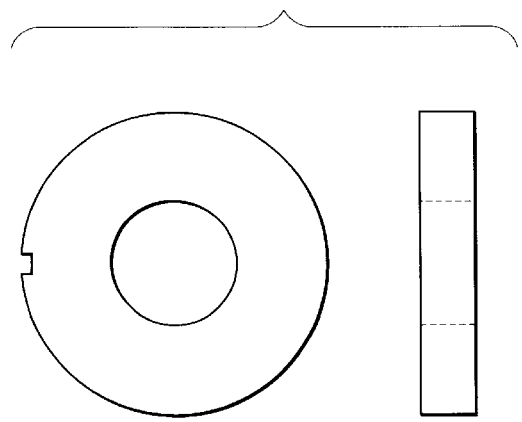

The engineering ceramic used in the Example 1 and the SUS440C used in the Comparative Example 1 were subjected to life evaluation. Life evaluation was carried out on the basis of results of a rolling test performed by a reciprocal thrust rolling life tester shown in FIG. 6A. A test specimen machined into the shape of a donut (having an outer diameter of 60 mm, an inner diameter of 25 mm, and a thickness of 10 mm) as shown in FIG. 6B is attached to the reciprocal thrust rolling life tester, a main shaft is rotated.

The engineering ceramic used in the Example 1 is $Si_3N_4$ that has been subjected to HIP. The SUS440C used in the Comparative Example 1 is a sintered steel product which has been hardened and tempered and has a surface hardness of 750 Hv or thereabouts.

Test was conducted under: a load of 627N per ball; six balls; a rotational speed of 800 rpm (min$^{-1}$); lubricating oil of LM oil L68 produced by THK Co., Ltd.; and oil quantity of 80 cm$^3$/min.

L50 (life revolutions at accumulated failure probability of 50%) of the engineering ceramic used in the Example 1 was about 0.96 to 1.59×10$^7$, whereas L50 of the sintered steel product to the SUS440C used in the Comparative Example 1 was about 2.1×10$^6$.

As has been described, according to a rolling guide apparatus of the invention, a sliding body main unit is constituted by a load rolling surface section made from engineering ceramic and a main body section made from machinable ceramic. Hence, the foregoing characteristic that has hitherto been required can be fulfilled, and weight reduction and high rigidity can be achieved. Consequently, high-speed start and stop operations with small inertia force can be made feasible.

According to the rolling guide apparatus of the invention, a race housing groove can be readily formed in the main body section made from machinable ceramic having ease of machining. Hence, a bearing race, which is a load rolling surface section having superior rolling fatigue strength, can be readily fitted into the race housing groove. The bearing race is made from engineering ceramic having superior rolling fatigue strength. Hence, a long-life rolling guide apparatus can be realized.

What is claimed is:

1. A rolling guide apparatus comprising:

a race shaft having a rolling element rolling surface formed in a longitudinal direction thereof;

a sliding table having an endless circulation passage including a load rolling surface corresponding to the rolling element rolling surface, the sliding table being movable relatively to the race shaft; and a plurality of rolling elements being housed in the endless circulation passage so as to circulate in accordance with relative movement of the race shaft and the sliding table, wherein the sliding table comprises: a sliding table main unit having the load rolling surface and a rolling element return passage substantially parallel to the load rolling surface; and side covers each having a changing direction passage for connecting ends of the load rolling surface and the rolling element return passage, the side covers being attached to respective ends of the sliding table main unit, and wherein the sliding table main unit comprises: a load rolling surface section made from engineering ceramic and having the load rolling surface; and a main body section made from machinable ceramic.

2. The rolling guide apparatus according to claim 1, further comprising:

a race housing groove being formed in the main body section; and a bearing race serving as the load rolling surface section, the bearing race being fitted into the race housing groove.

3. The rolling guide apparatus according to claim 2, wherein the race housing groove and the bearing race have semi-circular cross-sectional profiles which complement each other, the bearing race is rotatable with respect to the race housing groove.

* * * * *